United States Patent
Croft et al.

(10) Patent No.: US 8,518,130 B2
(45) Date of Patent: Aug. 27, 2013

(54) RELATING TO FUELS

(75) Inventors: Martin Tom Croft, Chester (GB);
George Robert Lee, Chester (GB);
Richard John Price, Ince Chester (GB);
Robert McDaniel, Palo Alto, CA (US)

(73) Assignee: Shell Oil Company, Houston, TX (US)

( * ) Notice: Subject to any disclaimer, the term of this patent is extended or adjusted under 35 U.S.C. 154(b) by 195 days.

(21) Appl. No.: 13/044,962

(22) Filed: Mar. 10, 2011

(65) Prior Publication Data
US 2011/0220053 A1 Sep. 15, 2011

Related U.S. Application Data

(60) Provisional application No. 61/312,307, filed on Mar. 10, 2010.

(51) Int. Cl.
*C10L 1/18* (2006.01)
(52) U.S. Cl.
USPC .......... 44/451; 44/388; 44/436; 44/437; 44/438; 44/439; 44/447; 44/452
(58) Field of Classification Search
USPC .......... 44/300, 451, 447, 388, 436, 437, 44/438, 439, 452
See application file for complete search history.

(56) References Cited

U.S. PATENT DOCUMENTS 3,274,224 A * 9/1966 Collier, Jr. et al. ............ 44/454
5,826,202 A 10/1998 Gscheidmeier et al. ....... 585/356

FOREIGN PATENT DOCUMENTS

| DE | 353933 | 5/1922 |
| DE | 1087845 | 8/1960 |
| RU | 1825653 | 7/1993 |
| WO | WO2010017099 | 2/2010 |

OTHER PUBLICATIONS

Adams, Robert P., "The Leaf Essential Oils and Chemotaxonomy of Juniperus sect. Juniperus", Pergamon, Biochemical Systematics and Ecology 26 (1998) pp. 637-645.
Lopez, Carmen M., "Catalytic Transformation of Camphene Over AFI-Like Aluminiphosphates Molecular Sieves", React Kinet Catal Lett, vol. 74, No. 1, pp. 163-170 (2001).
Daneshgari et al, "The Influence of Temperature 5 Upon Gasoline Deposit build-Up on the Intake Valves", Detroit, USA Feb., Mar. 1989.

* cited by examiner

*Primary Examiner* — Cephia D Toomer

(57) ABSTRACT

Gasoline fuel formulation containing (i) tricyclene, which is suitably biologically derived, and (ii) a gasoline base fuel. The formulation may contain one or more additional biofuel components or oxygenates: it may for example include ethanol, or ethanol together with one or more additional biofuels. The invention also provides a method for preparing the formulation, its use in a spark ignition engine, and the use of tricyclene in a gasoline fuel formulation for various purposes, including to enhance lubricity.

20 Claims, No Drawings

RELATING TO FUELS

This application claims the benefit of Provisional Application No. 61/312,307 filed Mar. 10, 2010, which is incorporated herein by reference.

FIELD OF THE INVENTION

This invention relates to gasoline fuel formulations, their preparation and their use.

BACKGROUND OF THE INVENTION

In the interests of the environment, and to comply with increasingly stringent regulatory demands, it is necessary to increase the amount of biofuels used in automotive fuels.

Biofuels are combustible fuels derived from biological sources, which result in a reduction in "well-to-wheels" (ie from source to combustion) greenhouse gas emissions. In gasoline fuels for use in spark ignition (petrol) engines, the most common biofuels are alcohols, in particular ethanol. These are typically blended with more traditional gasoline fuel components. However, the disruption of hydrogen-bonding when ethanol is combined with gasoline hydrocarbons results in an undesirable increase in the vapour pressure of the fuel. Ethanol also impacts the distillation properties of gasoline fuels, increasing their E70 and E100 values. As a result, a gasoline base fuel typically has to be specially reformulated if it is to be blended with ethanol, to ensure that the resultant blend meets gasoline specifications around the world. This reformulation naturally increases the cost and complexity of the fuel manufacturing process, and can limit the concentration at which ethanol can practically be included in gasoline fuels.

It is also known to include certain monoterpenes as biocomponents in gasoline fuels. These include monocyclic monoterpenes such as limonene, α- and β-phellandrene, α- and γ-terpinolene and γ-terpinene, and bicyclic monoterpenes such as α-pinene, β-pinene, 3-carene and α-fenchene, which are present in gum turpentine and crude sulphate turpentine produced by the wood pulping industry. Such monoterpenes have boiling points within the normal gasoline boiling range. However they have relatively low research octane numbers (RONs) and in particular motor octane numbers (MONs), and in addition they tend to have poor oxidative stability due to the degree of unsaturation in their molecules. These properties together make them less well suited for use in gasoline fuels.

It would be desirable to provide new biofuel-containing gasoline fuel formulations that could overcome or at least mitigate the above problems.

SUMMARY OF THE INVENTION

In one embodiment is provided, a gasoline fuel formulation comprising (i) tricyclene and (ii) a gasoline base fuel.

In another embodiment is provided, a process for the preparation of a gasoline fuel formulation comprising blending together tricyclene and a gasoline base fuel.

In another embodiment is provided, a method of operating an internal combustion engine, and/or a vehicle which is driven by an internal combustion engine, which method involves introducing into a combustion chamber of the engine in a gasoline fuel formulation containing tricyclene and a biofuel component or oxygenate, and operating the engine under condition to increasing the octane number, reducing the vapour pressure, modifying one or more distillation properties, increasing the energy content, or reducing the elastomer damaging effects of the formulation compared with operating under a gasoline composition without tricyclene.

DETAILED DESCRIPTION OF THE INVENTION

According to a first aspect of the present invention there is provided a gasoline fuel formulation containing (i) tricyclene and (ii) a gasoline base fuel.

Tricyclene [CAS no. 508-32-7] has the formula (I) shown below. It is a white crystalline solid with a boiling point of 152° C., ie within the normal gasoline boiling range. As a monoterpene, it is unique in having three ring structures:

(I)

It has surprisingly been found that tricyclene has far better octane properties and oxidative stability than the other monoterpenes mentioned above. It is therefore better suited for use as a gasoline fuel component. Indeed its physico-chemical properties (in particular its boiling point and octane numbers) make tricyclene ideal for blending with gasoline base fuels: the resultant mixture can have a higher octane number and better stability than could be achieved using other monoterpenes, and a lower vapour pressure than could be achieved using ethanol. Moreover the incorporation of tricyclene into a gasoline base fuel need not significantly alter its E70 and E100 values.

Tricyclene also has a higher LHV (lower heating value) than ethanol, and will therefore cause less of a reduction in fuel economy in gasoline blends. Moreover, whereas ethanol is miscible with water, which can present challenges for the handling of ethanol/gasoline fuel blends, tricyclene—like conventional gasoline hydrocarbons—is insoluble in water.

Tricyclene can also be obtained from biological sources. It can therefore be used to increase the biofuel content of a gasoline fuel formulation, without the above described drawbacks associated with the use of ethanol or the turpentine-derived monoterpenes.

Tricyclene has, further, been found to improve the lubricity of gasoline fuels, as described below in connection with the fourteenth aspect of the invention.

For use in a fuel formulation according to the invention, tricyclene can be obtained by any suitable method. It may be synthetic or naturally occurring. In an embodiment, it is biologically derived, by which is meant that it has been obtained—either directly or indirectly—from a biological source. Tricyclene for use in a fuel formulation according to the invention may advantageously comprise at least about 0.1 dpm/gC of carbon-14. It is known in the art that carbon-14 (C-14), which has a half-life of about 5,700 years, is found in biologically derived materials but not in fossil fuels.

By way of example, tricyclene can be made synthetically according to the method described in U.S. Pat. No. 5,826,202, which isomerises α-pinene into tricyclene and camphene. C M Lopez et al in React Kinet Catal Lett 74: 163-170 (2001) disclose the synthesis of tricyclene by contacting camphene with aluminophosphate-based molecular sieves. SU-1825653 appears to disclose the preparation of tricyclene from unsaturated terpenes using a catalyst comprising nickel, iron or cobalt sulphate, hydrated titanium dioxide and sodium hydroxide.

Also of increasing interest is obtaining tricyclene from natural, suitably renewable, sources. It can for example be extracted from a plant source such as the essential oil of the *Cordia Cylindrostachya* plant found in Central America, northern parts of South America and some of the Caribbean islands: this oil has been found to contain about 58% of tricyclene (C E Fun et al, J Essent Oil Res 2: 209-210 (1990)). The essential oil of *Chaerophyllum macrospermum*, a plant found in Iran, has been reported to contain 19.4% tricyclene (A Rustaiyan et al, J Essent Oil Res 14: 216-217 (2002)).

Tricyclene can also be obtained as a minor component (about 5% or less) from, for example, the essential oils of *Silphium perfoliatum* L, a plant found in central and eastern parts of the USA (R Kowalski et al, Flavour Fragr J 20: 306-310 (2005)); the essential oils of leaves of cultivated *Salvia fruiticosa*, a plant found in most countries of the eastern Mediterranean basin (A Karioti et al, J Agric Food Chem 51: 6505-6508 (2003)); and the leaf essential oils of nine species of *Juniperus* (R P Adams, Biochem Syst Ecol 26: 637-645 (1998)). The concentration of the tricyclene in a fuel formulation according to the invention may be 0.01% v/v or greater. It may be 0.05 or 0.1% v/v or greater, or 0.5 or 1 or 2 or 5% v/v or greater. It may be up to 65% v/v, or in cases up to 60 or 55 or 50 or 25 or 20 or 15 or 10% v/v. For example, the tricyclene concentration may be in the range of from 0.1 to 20% v/v, or from 5 to 10% v/v.

The tricyclene should ideally be dissolved in the fuel formulation, suitably fully dissolved. It may be present in a carrier fluid, for example a solvent selected from alkanes (for example n-heptane or other n-alkanes, or iso-octane); alcohols (for example ethanol or butanol); ethers (for example methyl t-butyl ether or ethyl t-butyl ether); alkenes such as diisobutylene; fuel components such as alkylates, isomerates, naphthas, straight run tops, light and heavy catalytically cracked gasolines or reformates; and mixtures thereof.

In the formulation of the invention, the gasoline base fuel is a liquid hydrocarbon distillate fuel component, or mixture of such components, containing hydrocarbons which boil in the range from 0 to 250° C. (ASTM D86 or EN ISO 3405) or from 20 or 25 to 200 or 230° C. The optimal boiling ranges and distillation curves for such base fuels will typically vary according to the conditions of their intended use, for example the climate, the season and any applicable local regulatory standards or consumer preferences.

The hydrocarbon fuel component(s) in the gasoline base fuel may be obtained from any suitable source. They may for example be derived from petroleum, coal tar, natural gas or wood, in particular petroleum.

Alternatively they may be synthetic products such as from a Fischer-Tropsch synthesis. Conveniently they may be derived in any known manner from straight-run gasoline, synthetically produced aromatic hydrocarbon mixtures, thermally or catalytically cracked hydrocarbons, hydrocracked petroleum fractions, catalytically reformed hydrocarbons or mixtures of these.

Typically, gasoline base fuels comprise components selected from one or more of the following groups: saturated hydrocarbons, olefinic hydrocarbons, aromatic hydrocarbons and oxygenated hydrocarbons. Conveniently, a gasoline base fuel may comprise a mixture of saturated hydrocarbons, olefinic hydrocarbons, aromatic hydrocarbons, and, optionally, oxygenated hydrocarbons. Typically, the olefinic hydrocarbon content of a gasoline base fuel is in the range from 0 to 40% v/v; it may for instance be in the range from 0 to 30% v/v. Typically, the aromatic hydrocarbon content of a gasoline base fuel is from 0 to 70% v/v; it may for instance be from 10 to 60% v/v.

The benzene content of a gasoline base fuel is typically at most 10% v/v, or at most 5% v/v, or at most 1% v/v. Typically, the saturated hydrocarbon content of a gasoline base fuel is at least 40% v/v; it may for instance be from 40 to 80% v/v.

The gasoline base fuel used in the present invention suitably has a low or ultra low sulphur content, for instance at most 1000 ppmw (parts per million by weight) of sulphur, or no more than 500 ppmw, or no more than 100 ppmw, or no more than 50 or even 10 ppmw. It also suitably has a low total lead content, such as at most 0.005 g/l; in an embodiment it is lead free ("unleaded"), ie having no lead compounds in it.

A gasoline base fuel will typically have a research octane number (RON) (ASTM D2699 or EN 25164) of 80 or greater, or of 85 or 90 or 93 or 94 or 95 or 98 or greater, for example from 80 to 110 or from 85 to 115 or from 90 to 105 or from 93 to 102 or from 94 to 100. It will typically have a motor octane number (MON) (ASTM D2700 or EN 25163) of 70 or greater, or of 75 or 80 or 84 or 85 or greater, for example from 70 to 110 or from 75 to 105 or from 84 to 95.

A gasoline base fuel will typically have an E70 value of 10% v/v or greater, or of 14 or 15 or 20 or 22% v/v or greater. Its E70 value might typically be up to 55% v/v, or up to 51 or 50 or 48% v/v. Its E70 value might for example be from 10 to 55% v/v, or from 14 to 51% v/v, or from 14 to 50% v/v, or from 20 to 50% v/v. In an embodiment, it has an E70 value of from 20 to 48% v/v. In an alternative embodiment, it has an E70 value of from 22 to 50% v/v.

The base fuel will typically have an E100 value of 35% v/v or greater, or of 40 or 45 or 46% v/v or greater. Its E100 value might typically be up to 75% v/v, or up to 72 or 71% v/v. Its E100 value might for example be from 35 to 75% v/v, or from 40 to 72% v/v, or from 40 to 71% v/v, or from 46 to 71% v/v.

The E70 value for a fuel is the volume percentage of the fuel that has been distilled at 70° C., whilst the E100 value is the volume percentage of the fuel that has been distilled at 100° C. Both E70 and E100 values can be measured using the standard test method EN ISO 3405.

The T70 value for a fuel is the temperature on its distillation curve at which 70% of its volume has evaporated at standard atmospheric pressure, whilst the T100 value for a formulation is the temperature on its distillation curve at which 100% of its volume has evaporated at standard atmospheric pressure. Both T70 and T100 values, as well as other T-values, can be measured using the standard test method EN ISO 3405.

The specific distillation curve, hydrocarbon composition, RON and MON of the gasoline base fuel are not however critical for the purposes of the present invention.

A gasoline base fuel might typically have a density from 0.720 to 0.775 kg/m3 at 15° C. (ASTM D4052, EN ISO 3675, EN 12185, IP 365 or analogous methods). For use in a summer grade gasoline fuel, a base fuel might typically have a vapour pressure at 37.8° C. (DVPE) of from 45 to 70 kPa or from 45 to 60 kPa (EN 13016-1, ASTM D4953-06, IP 394, EN ISO 3405 or analogous methods). For use in a winter grade fuel it might typically have a DVPE of from 50 to 100 kPa, for example from 50 to 80 kPa or from 60 to 90 kPa or from 65 to 95 kPa or from 70 to 100 kPa.

The gasoline base fuel may be or include one or more biofuel components, which are derived from biological sources. It may be or include one or more oxygenates such as those listed below as additional fuel components, in particular alcohols or ethers having boiling points below 210° C. Examples of suitable alcohols include C1 to C4 or C1 to C3 aliphatic alcohols, in particular ethanol. Suitable ethers include C5 or C5+ ethers. The base fuel may include one or more gasoline fuel additives, of the type that are well known in the art. It may be a reformulated gasoline base fuel, for example one which has been reformulated so as to accommodate the addition of an oxygenate such as ethanol.

Examples of suitable gasoline base fuels include those having an olefinic hydrocarbon content of from 0 to 20% v/v (ASTM D1319), and/or an oxygen content of from 0 to 5% w/w (EN 1601), and/or an aromatic hydrocarbon content of from 0 to 50% v/v (ASTM D1319), and/or a benzene content of at most 1% v/v. In an embodiment of the invention, the gasoline base fuel complies with the current European gasoline fuel standard EN 228. In an embodiment, it complies with the current US gasoline fuel standard ASTM D4814-08b.

The concentration of the gasoline base fuel, in a formulation according to the invention, may be 30% v/v or greater. It may for example be 40 or 50 or 60% v/v or greater. The concentration of the base fuel may be up to 99.99% v/v, or up to 99.95% v/v, or up to 99.9 or 99.5% v/v. It may be up to 99% v/v, for example up to 98 or 95 or 90% v/v, or in cases up to 85 or 80 or 75 or 70 or 65 or 60% v/v. The gasoline base fuel will typically represent the major proportion of a fuel formulation according to the invention.

A fuel formulation according to the invention may contain one or more additional fuel components. In an embodiment, it may contain one or more additional biofuel components. Such additional fuel components may have boiling points within the normal gasoline boiling range, and in the case of biofuel components will have been derived—whether directly or indirectly—from biological sources. The or each additional fuel component may advantageously comprise at least about 0.1 dpm/gC of carbon-14.

In an embodiment, the formulation may contain one or more oxygenates, which may for example be selected from alcohols, ethers (including cyclic ethers), esters, carboxylic acids and their derivatives, aldehydes, ketones, and mixtures thereof. In an embodiment, the formulation contains one or more oxygenates selected from alcohols, ethers, esters and mixtures thereof. In an embodiment, it contains one or more oxygenates selected from alcohols, ethers and mixtures thereof. Such oxygenates are suitably derived from biological sources.

Alcohols suitable for inclusion in a formulation according to the invention include C1 to C5 saturated or unsaturated alcohols, in particular C1 to C4 aliphatic alcohols such as ethanol and butanol. In particular, a formulation according to the invention may include ethanol. It may include ethanol and one or more—for example one—additional biofuel components. It may include ethanol and one or more—for example one—additional oxygenates.

Ethers suitable for inclusion in a formulation according to the invention include dialkyl ethers, in particular alkyl t-butyl ethers, more particularly (C1 to C3 alkyl) t-butyl ethers such as methyl t-butyl ether and ethyl t-butyl ether. Other suitable ethers include furans; C5 and C5+ ethers having boiling points below 210° C.; and C7 ethers—in particular ethyl ethers—such as 2-ethoxy-2-methylbutane and 1-ethoxy-3-methylbutane. In particular, a formulation according to the invention may include ethanol together with one or more ethers selected from (C1 to C3 alkyl) t-butyl ethers and mixtures thereof.

Since an individual biofuel component is unlikely to embody all the physical properties desirable for inclusion in a gasoline fuel formulation, it can be advantageous to combine two or more biofuel components in order to offset any disadvantageous properties of one with the advantageous properties of the other(s). The natures and concentrations of the components of such a combination can be chosen so as to achieve desired properties for the overall fuel formulation which contains it, and thus to increase the total biofuel content of the formulation without unduly impairing its performance. This in turn can assist the fuel formulator in meeting increasingly stringent fuel specifications. In particular the inclusion of tricyclene, in accordance with the invention, allows the formulator greater flexibility because the tricyclene itself has good octane properties (compared for example to other monoterpenes), and (in contrast to ethanol) no negative impact on the vapour pressure or the energy content (LHV) of the fuel and relatively little effect on the distillation properties of a conventional gasoline base fuel. The present invention can therefore reduce the cost and complexity associated with formulating a gasoline fuel to meet a target specification, for example a target octane number or vapour pressure.

Thus, in particular, the present invention can allow the formulation of a gasoline fuel containing a proportion of ethanol, suitably bioethanol, together with tricyclene, in which the tricyclene can compensate at least partially for any increase in vapour pressure due to the presence of the ethanol, or for any other potentially undesirable effect of the ethanol.

Where a fuel formulation according to the invention contains ethanol, the ethanol concentration may for example be 1 or 2 or 5% v/v or greater, or 8 or 10 or 15 or 20 or 25 or 30% v/v or greater, based on the overall formulation. The ethanol concentration may be up to 50% v/v, or up to 45 or 40 or 35% v/v. In cases it may be up to 30 or 25 or 20 or 15 or 10% v/v.

In such a formulation, the volume ratio of the tricyclene to the ethanol may be for example 1:100 or greater, or 1:50 or 1:10 or greater, for example 1:5 or 1:2 or greater, or 1:1 or 1.5:1 or greater. It may be up to 5:1, or up to 4:1 or 3:1 or 2:1 or 1:1. In particular where the formulation does not contain any additional biofuel components or oxygenates, the volume ratio of the tricyclene to the ethanol may be 1:1 or greater, or 1.2:1 or greater, or 1.5:1 or greater, or 1.8:1 or greater; in this case the ratio may for example be up to 5:1, or up to 4:1 or 3:1 or 2.5:1, for example from 1.5:1 to 3:1.

Where the formulation includes a combination of tricyclene and ethanol, or a combination of tricyclene, ethanol and one or more additional biofuel components or oxygenates, the concentration of the combination in the formulation may be 1% v/v or greater, or 2 or 3 or 4 or 5% v/v or greater. The concentration of the combination may be up to 50% v/v, or up to 40 or 30% v/v, or up to 25 or 20 or 15 or 10% v/v. These concentrations are for the combination as a whole in the overall gasoline fuel formulation, even if one or more components of the combination are in practice added individually when preparing the formulation.

The formulation of the invention should be suitable for use in a spark ignition (petrol) internal combustion engine. It may in particular be suitable for use as an automotive fuel.

The MON of a fuel formulation according to the invention is suitably 70 or greater, or 75 or 80 or greater. It may be 84 or 85 or greater. The MON may for example be from 70 to 110 or from 75 to 105 or from 84 to 95. MON values may be measured using the standard test method ASTM D2700 or EN 25163 or an analogous method.

The RON of a formulation according to the invention is suitably 80 or greater. It may be 85 or 90 or 93 or 94 or 95 or 98 or greater. The RON may for example be from 80 to 110 or from 85 to 115 or from 90 to 105 or from 93 to 102 or from 94 to 100. RON values may be measured using the standard test method ASTM D2699 or EN 25164 or an analogous method.

The vapour pressure at 37.8° C. (DVPE) of a formulation according to the invention is suitably 100 kPa or less. It may be 90 or 80 or—in particular where it is intended for use as a summer grade fuel—70 or 60 kPa or less. DVPE (dry vapour pressure equivalent) values may be measured using the standard test method EN 13016-1, IP 394, EN ISO 3405, ASTM D4953-06 or an analogous method.

A fuel formulation according to the invention will suitably comply with applicable current standard gasoline fuel specification(s) such as for example EN 228 in the European Union. By way of example, the overall formulation may have a density from 0.720 to 0.775 kg/m$^3$ at 15° C. (ASTM D4052, EN ISO 3675, IP 365, or EN 12185); a final boiling point (ASTM D86 or EN ISO 3405) of 210° C. or less; a RON (ASTM D2699 or EN 25164) of 95.0 or greater; a MON (ASTM D2700 or EN 25163) of 85.0 or greater; an olefinic hydrocarbon content of from 0 to 20% v/v (ASTM D1319); and/or an oxygen content of from 0 to 5% w/w (EN 1601).

Currently, the EN 228 gasoline specification requires that the E70 value of a gasoline fuel formulation be from 20 to 50% v/v (specifically, for summer grade gasoline the E70 value should be from 20 to 48% v/v, whilst for winter grade gasoline it should be from 22 to 50% v/v). EN 228 also requires the E100 value to be from 46 to 71% v/v. Relevant specifications may however differ from country to country and from year to year, and may depend on the intended use of the formulation. Moreover a formulation according to the invention may contain fuel components with properties outside of these ranges, since the properties of an overall blend may differ, often significantly, from those of its individual constituents.

Suitable concentrations for the components of the fuel formulation (for example the tricyclene and base fuel; or the tricyclene, base fuel and ethanol; or the tricyclene, base fuel, ethanol and any additional biofuel components or oxygenates) may be chosen so as to achieve one or more desired properties for the formulation as a whole, for example a minimum desired RON or in particular MON, and/or a DVPE below a target maximum. Thus the relative concentrations will also depend on the physicochemical properties of the individual components. Suitable concentrations may be calculated by applying appropriate blending rules to the properties (for example the octane numbers, E70 or E100 values or DVPEs) of the individual components. For these purposes, blending values should be used for the relevant properties of each of the components.

The DVPE of a blend of fuel components (for example tricyclene, ethanol and an additional biofuel) in a gasoline base fuel may for example be calculated using the Chevron blend rule, which provides that:

$$DVPE^{1.25} = DVPE_{base\,fuel}^{1.25} v_{base\,fuel} + \Sigma DVPE_n^{1.25} v_n$$

where $DVPE_n$ and $v_n$ are the blending DVPE and volume fraction of component n, and $DVPE_{base\,fuel}$ and $v_{base\,fuel}$ are the DVPE and volume fraction of the base fuel.

The distillation properties, for example E70 or E100, may be calculated for such a fuel blend using linear blending rules, which provide for example that:

$$E70_{blend} = E70_{base\,fuel} v_{base\,fuel} + \Sigma E70_n v_n$$

where $E70_n$ and $v_n$ are the blending E70 and volume fraction of component n, and $E70_{base\,fuel}$ and $v_{base\,fuel}$ are the E70 and volume fraction of the base fuel.

Similarly the MON of such a blend may be calculated using linear blending rules, such that:

$$MON_{blend} = MON_{base\,fuel} v_{base\,fuel} + MON_n v_n$$

where $MON_n$ and $v_n$ are the blending MON and volume fraction of component n, and $MON_{base\,fuel}$ and $v_{base\,fuel}$ are the MON and volume fraction of the base fuel. RON values can be calculated in the same way.

A blending value for a property of a component n, for instance a blending E70 value, may be obtained in known fashion. For a blend of fuel components in a gasoline base fuel, a value for E70 for example can be calculated for a component n as follows:

$$E70_n = \frac{E70_{blend} - E70_{base}(1 - v_{fn})}{v_{fn}}$$

where: $E70_n$ is the blending E70 value for component n; $v_{fn}$ is the volume fraction of the component n in the blend; $E70_{base}$ is the E70 value of the base fuel; and E70 blend is the E70 value of the blend containing the base fuel and component n.

A blending value for E100 can be calculated in an analogous fashion.

Blending values for DVPE can be calculated as described in Example 2 below.

In a fuel formulation according to the invention, such blending properties will depend in part on the relevant properties for the gasoline base fuel, which must also be taken into account when determining the natures and concentrations of the additional fuel components in order for the overall formulation to meet a desired target specification. For a binary or ternary mixture of fuel components (for example tricyclene and ethanol; or tricyclene, ethanol and an additional biofuel), a two- or three-way composition plot may be used to provide a visual indication of which concentration ratios could be used in the mixture so as to yield, when blended with a gasoline base fuel, a fuel formulation having the desired properties overall.

In an embodiment of the invention, the natures and relative concentrations of the tricyclene and of any other biofuel components or oxygenates present in the formulation are chosen so as to have as low as possible an impact on the vapour pressure, E70 and/or E100 values of the gasoline base fuel with which they are combined. In an embodiment, the natures and relative concentrations of such components are chosen so that in combination they have a lower impact on the vapour pressure, E70 and/or E100 values of the base fuel than would ethanol if blended with the base fuel at the same concentration as the combination.

In an embodiment of the invention, the tricyclene, or the combination of the tricyclene and any additional biofuels or oxygenates present, does not increase the DVPE of the gasoline base fuel. In other words:

$$\Delta DVPE \leq 0 \text{ kPa}$$

where $\Delta DVPE$ is the difference between the DVPE of the overall fuel formulation and that of the gasoline base fuel. Alternatively, $\Delta DVPE$ may be the difference between the DVPE of the overall fuel formulation and that of the same formulation in the absence of the tricyclene and the additional biofuel(s) or oxygenate(s).

In another embodiment, the tricyclene, or the combination of the tricyclene and any additional biofuels or oxygenates present, has a low effect, if any, on the E70 and E100 values for the gasoline base fuel. In an embodiment, the tricyclene, or the combination of the tricyclene and any additional biofuels or oxygenates present, does not significantly alter the E70 and E100 values for the gasoline formulation as a whole compared to the values for the base fuel alone. By the term "not significantly alter the E70 and E100 values" is meant that both the E70 value and the E100 value of the gasoline formulation are maintained within 25%, or within 20%, or within 15%, of both the E70 value and the E100 value of the gasoline base fuel, and/or that the value of (E70+E100) for the gasoline formulation is maintained within 15%, or within 10%, or within 5% of the value of (E70+E100) for the base fuel.

In an embodiment:

$$-20\% \text{ v/v} \leq (\Delta E70 + \Delta E100) \leq 20\% \text{ v/v},$$

where $\Delta E70$ is the difference between the E70 of the overall fuel formulation and that of the same formulation in the absence of the tricyclene and the additional biofuel(s) or oxygenate(s); and $\Delta E100$ is the difference between the E100 of the overall fuel formulation and that of the same formulation in the absence of the tricyclene and the additional biofuel(s) or oxygenate(s). Alternatively $\Delta E70$ may be seen as the difference between the E70 of the overall fuel formulation and that of the gasoline base fuel alone, and $\Delta E100$ as the difference between the E100 of the overall fuel formulation and that of the base fuel alone.

It may be preferred that:

$$-15\% \text{ v/v} \leq (\Delta E70 + \Delta E100) \leq 15\% \text{ v/v},$$

or that:

$$-10\% \text{ v/v} \leq (\Delta E70 + \Delta E100) \leq 10\% \text{ v/v},$$

or that:

$$-5\% \text{ v/v} \leq (\Delta E70 + \Delta E100) \leq 5\% \text{ v/v},$$

or that:

$$-1\% \text{ v/v} \leq (\Delta E70 + \Delta E100) \leq 1\% \text{ v/v},$$

or in cases that:

$$\Delta E70 + \Delta E100 = 0\% \text{ v/v}.$$

These constraints may be seen as a need for $\Delta E70$ to counter, at least partially, $\Delta E100$. For example, where a formulation according to the invention includes both ethanol and an additional biofuel or oxygenate X, suitable relative concentrations for its components may be calculated so as to satisfy the following equation:

$$\Sigma_{n=1}^{n=3} v_{fn} E70_n - E70_{base} = E100_{base} - \Sigma_{n=1}^{n=3} v_{fn} E100_n$$

wherein:
n=1 is tricyclene,
n=2 is ethanol,
n=3 is the additional biofuel or oxygenate X,
$v_{fn}$ is the volume fraction of the component represented by n in the ternary mixture of tricyclene, ethanol and X,
$E70_n$ is the blending E70 value of the component represented by n,
$E100_n$ is the blending E100 value of the component represented by n,
$E70_{base}$ is the E70 value of the gasoline base fuel, and
$E100_{base}$ is the E100 value of the gasoline base fuel.

In yet another embodiment of the invention, the combination of the tricyclene and any additional biofuels or oxygenates present does not reduce the MON of the base fuel. In other words:

$$\Delta MON \geq 0$$

where $\Delta MON$ is the difference between the MON of the overall fuel formulation and that of the gasoline base fuel. Alternatively, $\Delta MON$ may be the difference between the MON of the overall fuel formulation and that of the same formulation in the absence of the tricyclene and the additional biofuel(s) or oxygenate(s).

A fuel formulation according to the invention may contain one or more standard fuel or refinery additives which are suitable for use in gasoline fuels. Many such additives are known and commercially available. They may be present in the base fuel, or may be added to the fuel formulation at any point during its preparation, including as a premix with one or more other components of the formulation.

According to another aspect of the present invention, there is provided a process for the preparation of a gasoline fuel formulation, which process involves blending together tricyclene and a gasoline base fuel, optionally with one or more fuel additives. The nature of the base fuel, and the concentrations of the tricyclene and the base fuel, may be as described above in connection with the first aspect of the invention. The tricyclene may be added to the base fuel as a solid, or in the form of a solution in an appropriate fluid carrier. The process may be used to produce at least 1,000 liters of the fuel formulation, or at least 5,000 or 10,000 or 20,000 or 50,000 liters.

In an embodiment of the invention, the process also involves blending the tricyclene and the gasoline base fuel with one or more additional biofuel components or oxygenates as described hereinabove, in particular with one or more biofuel components. Any or all of these additional components may be premixed with the tricyclene prior to blending the resultant premix with the gasoline base fuel. The premix may be blended with the base fuel at any appropriate point during the manufacture of the fuel formulation, for example at the refinery or at the depot. Alternatively, the base fuel may be blended firstly with the tricyclene and subsequently with the additional biofuel component(s) or oxygenate(s); or the base fuel may be blended firstly with the additional component(s) and subsequently with the tricyclene.

In a particular embodiment, the process of the invention involves blending together tricyclene, ethanol and a gasoline base fuel, optionally with one or more additional biofuel components, for example ethers.

Another aspect of the invention provides a method of operating an internal combustion engine, and/or a vehicle which is driven by an internal combustion engine, which method involves introducing into a combustion chamber of the engine a gasoline fuel formulation according to the first aspect of the invention. The engine is preferably a spark ignition engine.

Another aspect provides a system that includes an internal combustion engine and a source of a gasoline fuel formulation according to the first aspect. Again the engine is preferably a spark ignition engine. The system may be a vehicle. The source of the fuel formulation may be a fuel tank containing the formulation.

According to another aspect, there is provided a fuel component premix, suitable for inclusion in a gasoline fuel formulation, the premix comprising both tricyclene and one or more additional components selected from biofuels and oxygenates. The additional component(s) may be of the type described above in connection with the first aspect of the invention, and their natures and concentrations may be selected in the manner described above, for instance so as to achieve one or more target properties when blended with a gasoline base fuel. In an embodiment, one or more—in cases all—of the additional component(s) are biofuels, ie fuel components derived from a biological source. In an embodiment, one or more—in cases all—of the additional component(s) are oxygenates, for example selected from alcohols and ethers. In a further embodiment, one or more—in cases all—of the additional component(s) are biologically derived oxygenates. The premix may advantageously comprise at least about 0.1 dpm/gC of carbon-14.

In one specific embodiment, the fuel component premix contains both tricyclene and ethanol. Such a premix may also include one or more additional biofuel components and/or oxygenates, for example a (C1 to C3 alkyl) t-butyl ether.

A premix according to the fifth aspect of the invention may for example be blended with a gasoline base fuel, in order to prepare a fuel formulation according to the first aspect of the invention.

In another aspect of the invention provides a method of operating an internal combustion engine, and/or a vehicle which is driven by an internal combustion engine, which method involves introducing into a combustion chamber of the engine in a gasoline fuel formulation containing tricyclene and a biofuel component or oxygenate, and operating the engine under condition to increasing the octane number, reducing the vapour pressure, modifying one or more distillation properties, increasing the energy content, or reducing the elastomer damaging effects of the formulation compared with operating under a gasoline composition without tricyclene. The octane number may be the RON and/or the MON, suitably at least the latter. The invention may be used to achieve any degree of increase in the octane number(s) of the fuel formulation, and/or for the purpose of achieving a desired target octane number, for example a target set by an applicable current standard such as EN 228.

The use of tricyclene, in a gasoline fuel formulation containing a biofuel component or oxygenate, may reduce the vapour pressure, in particular the DVPE, of the formulation compared to formulates without tricyclene.

The vapour pressure of a fuel formulation can be assessed by any suitable method; its dry vapour pressure equivalent (DVPE) may for example be measured using a standard test method such as EN 13016-1, ASTM D4953-06, IP 365, EN 12185 or an analogous method.

The invention may be used to achieve any degree of reduction in the vapour pressure of the fuel formulation, and/or for the purpose of achieving a desired target vapour pressure, for example a target set by an applicable current standard such as EN 228.

The use of tricyclene, in a gasoline fuel formulation containing a biofuel component or oxygenate, may modify one or more distillation properties of the formulation. The tricyclene may in particular be used to lower the E70 and/or E100 values of the formulation.

The distillation properties of a fuel formulation can be assessed by any suitable method, for example a standard test method such as EN ISO 3405, IP 123 or ASTM D86. The invention may be used to achieve any degree of modification of any one or more distillation properties of the fuel formulation (for example selected from boiling points and E values). It may be used for the purpose of achieving a desired target property, for example a target set by an applicable current standard such as EN 228: this may for instance be a target initial or final boiling point, or a target E70 or E100 value.

The use of tricyclene, in a gasoline fuel formulation containing a biofuel component or oxygenate, may increase the energy content of the formulation, and/or for improving fuel economy when the formulation is used in a fuel-consuming system such as a spark ignition engine compared to a gasoline fuel composition without tricyclene. The energy content of a fuel formulation can be assessed using any suitable method, for example ASTM D240-09, which measures the lower heating value (LHV) of the formulation: a higher LHV indicates a higher energy content.

It has further been found, as shown in Example 6 below, that tricyclene has better elastomer compatibility than ethanol. Thus a tenth aspect of the invention provides the use of tricyclene, in a gasoline fuel formulation containing a biofuel component or oxygenate, for the purpose of reducing the elastomer damaging effects of the formulation.

An elastomer damaging effect may be any effect which reduces the ability of an elastomeric material to function correctly in a fuel-consuming system and/or in the presence of a fuel formulation. It may in particular comprise swelling of the elastomer when in contact with the fuel formulation. It may comprise a change (typically a reduction) in the hardness and/or flexibility of the elastomer when in contact with the fuel formulation.

Elastomer swell measurements in particular provide a measure of the compatibility of elastomeric materials, such as are used in fuel pump seals and other engine components, with a fuel component or formulation. Generally this compatibility is evaluated by assessing changes in the properties of an elastomer due to its immersion in a test fluid. The elastomer swelling effects of a fuel formulation may for instance be assessed by measuring the increase or percentage increase in volume or mass of an elastomeric material on immersion in the formulation for a predetermined period of time. A smaller volume or mass increase indicates a reduction in elastomer swelling effects. This assessment may for example be carried out for nitrile and/or fluorocarbon elastomers. A standard test method such as DIN 51605-1 or ISO 1817:1998 may be used to measure elastomer swell effects. Changes in the hardness and/or flexibility of an elastomeric material may be assessed using standard test methods such as the Shore hardness test or TMS 556.

The biofuel component or oxygenate may in particular be a biofuel component, for example ethanol, in particular biologically derived ethanol.

In the present context, "achieving" a desired target property also embraces—and in an embodiment involves—improving on the relevant target. Thus, for example, tricyclene may be used to produce a fuel formulation which has an octane number above a desired target value, or a vapour pressure below a desired target value.

In another embodiment, the invention provides the use of biologically derived tricyclene, in a gasoline fuel formulation, for the purpose of increasing the biofuel content of the formulation without, or without unduly, reducing the octane number (in particular the MON) of the formulation. A twelfth aspect provides the use of biologically derived tricyclene, in a gasoline fuel formulation, for the purpose of increasing the biofuel content of the formulation without, or without unduly, increasing the vapour pressure of the formulation. In the context of the eleventh and twelfth aspects of the invention, the gasoline fuel formulation may contain one or more additional biofuel components, which may be or include ethanol.

The tricyclene in a gasoline fuel formulation, may replace or, at least partially, a biofuel component and/or an oxygenate in the formulation. In an embodiment, the tricyclene is biologically derived. The tricyclene may thus be used as a substitute for at least some of the biofuel component or oxygenate which would otherwise have been included in the formulation, for example so as to achieve a desired target specification such as a minimum biofuel content. For instance, a quantity of biologically derived tricyclene may be included in a gasoline fuel formulation in place of the same or a similar quantity of ethanol, allowing a target minimum biofuel content to be achieved but without, or with fewer of, the drawbacks associated with the use of ethanol alone.

It has also been found that the inclusion of tricyclene in a gasoline fuel formulation can enhance the lubricity of the formulation. Again tricyclene differs in this respect from other monoterpenes, which have been found not to enhance fuel lubricity to the same extent, if at all. The lubricity-enhancing effects of tricyclene are also far superior to those of ethanol, providing another advantage to the use of tricyclene either instead of or together with ethanol in a gasoline fuel formulation, for example in accordance with the thirteenth aspect of the invention.

The lubricity of a fuel formulation can be assessed by any suitable method. One such method involves measuring the wear scar produced on an oscillating ball from contact with a stationary plate whilst immersed in the formulation. This "wear scar" may be measured for example using the test described in Example 5 below.

An "improvement" in the lubricity of a formulation may be manifested for example by a lower degree of wear scar, or of other friction-induced damage, in two relatively-moving components which are exposed to the formulation. The invention may be used to achieve any degree of improvement in the lubricity of the fuel formulation, and/or for the purpose of achieving a desired target lubricity.

In the context of the present invention, "use" of tricyclene in a gasoline fuel formulation means incorporating the tricyclene into the formulation, typically as a blend (ie a physical mixture) with one or more other fuel components such as a gasoline base fuel and optionally one or more additional biofuel components or oxygenates. The tricyclene will conveniently be incorporated before the formulation is introduced into an engine or other system which is to be run on the formulation. Instead or in addition the use of tricyclene may involve running a fuel-consuming system, typically an internal combustion engine, on a gasoline fuel formulation containing the tricyclene, typically by introducing the formulation into a combustion chamber of an engine.

A fuel formulation according to the invention, or a formulation prepared or used according to the invention, may be marketed with an indication that it benefits from an improvement due to the inclusion of the tricyclene. The marketing of such a formulation may include an activity selected from (a) enclosing the formulation in a container that comprises the relevant indication; (b) supplying the formulation with product literature that comprises the indication; (c) providing the indication in a publication or sign (for example at the point of sale) that describes the formulation or product; and (d) providing the indication in a commercial which is aired for instance on the radio, television or internet. The improvement may be attributed, in such an indication, at least partly to the presence of the tricyclene. The invention may involve assessing the relevant property of the formulation during or after its preparation. It may involve assessing the relevant property both before and after incorporation of the tricyclene, for example so as to confirm that the tricyclene contributes to the relevant improvement in the formulation.

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

Where upper and lower limits are quoted for a property, for example for the concentration of a fuel component, then a range of values defined by a combination of any of the upper limits with any of the lower limits may also be implied.

The present invention will now be further described with reference to the following non-limiting examples.

EXAMPLE 1

A gasoline fuel formulation according to the invention was prepared by dissolving 112.3 g of tricyclene in 3120 mL of a commercially available gasoline base fuel GBF1 (ex Shell).

The tricyclene was sourced from Chiron AS. It had a purity of ~95%, and GC-MS analysis showed its composition to be: tricyclene (95% peak area); camphene (5% peak area); 5-ethylidene bicyclo[2.2.1]hept-2-ene (trace); 1,7,7-trimethyl bicyclo[2,2,1]hept-2ene (trace).

The gasoline base fuel was an unleaded gasoline fuel having an octane (RON) rating of 95.

The properties of the resultant formulation are shown, alongside those of the base fuel alone, in Table 1 below. Table 1 also shows, where applicable, some of the tricyclene properties (the DVPE, RON, MON and E values quoted for tricyclene are blending values, obtained using the base fuel GBF1).

TABLE 1

| Fuel property | Test method | GBF1 | GBF1 + tricyclene | Tricyclene |
|---|---|---|---|---|
| DVPE (kPa) | IP 394 | 89.3 | 86.0 | 0* |
| RON | ASTM D2699 | 95.8 | 95.9 | 98 |
| MON | ASTM D2700 | 85.2 | 85 | 80 |
| Density (kg/m$^3$) | IP 365 | 728.9 | 735.8 | 910 |
| IBP (° C.) | IP 123 | 29.3 | 29.8 | 152 |
| FBP (° C.) | EN ISO 3405 | 194.9 | 193.5 | 152 |
| Residue (% v/v) | EN ISO 3405 | 1.0 | 1.2 | |
| Recovery (% v/v) | EN ISO 3405 | 95.3 | 95.4 | |
| Loss (% v/v) | EN ISO 3405 | 3.7 | 2.4 | |
| T10 (° C.) | EN ISO 3405 | 43.1 | 43.1 | |
| T20 (° C.) | EN ISO 3405 | 53.5 | 54.1 | |
| T30 (° C.) | EN ISO 3405 | 65.0 | 67 | |
| T40 (° C.) | EN ISO 3405 | 77.7 | 80.4 | |
| T50 (° C.) | EN ISO 3405 | 90.5 | 94.4 | |
| T60 (° C.) | EN ISO 3405 | 102.7 | 107.5 | |
| T70 (° C.) | EN ISO 3405 | 114.5 | 119.5 | |
| T80 (° C.) | EN ISO 3405 | 128.9 | 134.4 | |
| T90 (° C.) | EN ISO 3405 | 149.3 | 151.3 | |
| T95 (° C.) | EN ISO 3405 | 163.7 | 165.3 | |
| E70 (% v/v) | EN ISO 3405 | 33.9 | 32.2 | −9 |
| E100 (% v/v) | EN ISO 3405 | 57.6 | 54.3 | −25 |
| E120 (% v/v) | EN ISO 3405 | 74.1 | 70.4 | −19 |
| E150 (% v/v) | EN ISO 3405 | 90.3 | 88.8 | 53 |
| E180 (% v/v) | EN ISO 3405 | 97.6 | 97.5 | 95 |

TABLE 1-continued

| Fuel property | Test method | GBF1 | GBF1 + tricyclene | Tricyclene |
|---|---|---|---|---|
| Unwashed gum (mg/100 mL) | IP 131 | 7 | 7 | |
| Induction period (min) | IP 40 | 1105 | 1089 | |
| Peroxides (mg/kg) | SMS 359 | 0.23 | <0.01 | |
| Total acids (mgKOH/g) | IP 139 | <0.01 | 0.01 | |
| Cu corrosion | IP 154 | 1a | 1a | |
| MIHPT rating | See below | 35** | 19 | |

*DVPE data on 5% v/v blends indicates a physically impossible negative vapour pressure for tricyclene within the typically applied blend rule. The blending DVPE of tricyclene is consequently assigned as zero.
**A fuel with a high deposit-forming tendency would typically have a rating >200.

The MIHPT (multiple inclined hot plate rig test) method used was an intake valve deposit simulator test corresponding closely to that described in SAE Paper 890215, Daneshgari et al, "The Influence of Temperature upon Gasoline Deposit Build-Up on the Intake Valves", Detroit, USA, 27 Feb. to 3 Mar. 1989. The test rig utilised four inclined plates in parallel. The plates were strips of sandblasted aluminium, each 50 cm long and 2.5 cm wide, each having a 3 mm wide, 1 mm deep central groove along its length. These plates were mounted in the rig at an angle of 3 degrees relative to the horizontal. The temperature at the top end of each plate was maintained at 400° C., whilst at the middle of each plate it was maintained at 250° C.

The test samples each contained 100 ml of the relevant fuel or fuel formulation. They were delivered at a rate of 0.6 ml/minute from glass syringes fitted with 20 gauge steel hypodermic Luer lock needles into the groove at the top end of each plate. Once sample delivery was complete, the plates were allowed to cool to ambient temperature (20° C.) and were washed with n-heptane until the run-off liquid was clear. They were then left to dry before assessment of any deposit present.

Assessments were made using a SeeScan™ Marker Image Analyser with 512*512 image memory coupled to a Sony™/SeeScan™ CCD camera equipped with Nikon™ f55 macro lens. The plate being assessed was lit by two 12V tungsten lamps mounted at a linear distance of 22 cm from the point on the plate upon which the camera was focused and at angles of 33 degrees and 147 degrees relative to the plate.

An image was captured of a clear portion of each plate. A second image was then captured of the section of the plate containing deposit. The image analyser divides, pixel by corresponding pixel, the deposit image by the clean image and automatically measures the area and optical density of deposit at the pixels contained within the overall measuring frame, and calculates an integrated optical density for the image, the numerical value of which is recorded as a test rating.

It can be seen from Table 1 that inclusion of tricyclene, at around 4% v/v, is able to maintain the boiling points and octane values of the base fuel, reduces DVPE of the base fuel, and further reduces or maintains the distillation profile of the base fuel.

The addition of tricyclene also has no negative impact on oxidative stability, whilst the MIHPT results indicate that tricyclene has a low tendency to form engine inlet valve deposits.

This example demonstrates that biologically derived tricyclene could be included in a gasoline fuel formulation so as to increase its biofuel content, while maintaining or improving other fuel properties including vapor pressure, octane rating, distillation properties or oxidative stability of the formulations.

EXAMPLE 2

This example compares the properties of tricyclene, and its suitability for use as a gasoline fuel component, with those of other monoterpenes.

Blending values were obtained for various properties of tricyclene when blended with the base fuel GBF1 at 10% v/v. The following equation was used to calculate blending RON, MON and E values:

$$P_{C10H16} = \frac{[P_{ULG95+C10H16} - P_{ULG95}(1 - v_{C10H16})]}{v_{C10H16}}$$

where, on the right hand side of the equation, P is the relevant fuel property, for example RON, MON, E70, E100, E120, E150 or E180; vC10H16 is the volume fraction of tricyclene in the blend; ULG95 is the base fuel GBF1; and C10H16 is tricyclene.

To calculate the blending DVPE, the following equation was used:

$$DVPE_{C10H16} = \left( \frac{[(DVPE_{ULG95+C10H16})^{1.25} - (DVPE_{ULG95})^{1.25}(1 - v_{C10H16})]}{v_{C10H16}} \right)^{0.8}$$

where DVPEn is the dry vapour pressure equivalent of a component or mixture n.

Corresponding blending values were also calculated for ethanol and butanol, and for two monoterpenes present in crude sulphate turpentine samples (ex Arizona Chemicals). The first sample contained a major proportion of α-pinene and the second a major proportion of 3-carene and β-pinene. Their other constituents were determined by GC-MS to be as follows:

Sample a: α-pinene (75.7%), β-pinene (7.6%), camphene (6.8%), γ-terpinolene (2.3%), 3-carene (1.3%), α-fenchene (1.2%), β-phellandrene (0.7%), limonene (0.6%).

Sample b: 3-carene (46.5%), β-pinene (18.5%), limonene (14.3%), α-pinene (5.9%), α-phellandrene (5.3%), [1-methyl-2-(1-methylethyl)benzene (3.1%)], α-terpinolene (1.8%), β-phellandrene (1.5%), γ-terpinene (1.1%), camphene (0.8%), [1-methyl-4-(1-methylethyl)benzene (0.5%)]. [The molecules in square brackets are C10H14 isomers.]

The blending values obtained are shown in Table 2 below. Unless otherwise stated, the components were splash blended into the base fuel at 10% v/v. Table 3 shows boiling points, lower heating values (LHVs), oxygen contents and densities for the pure fuel components.

TABLE 2

| Fuel component | RON | MON | DVPE (kPa) | E70 (% v/v) | E100 (% v/v) | E120 (% v/v) | E150 (% v/v) | E180 (% v/v) |
|---|---|---|---|---|---|---|---|---|
| EtOH (5% v/v) | 120 | 106 | 170 | 235 | 110 | 100 | 100 | 100 |
| EtOH (10% v/v) | 120 | 106 | 120 | 235 | 110 | 100 | 100 | 100 |
| 1-BuOH | 86 | 78 | 39 | −8 | 93 | 124 | 96 | 112 |
| α-pinene | 84 | 51 | 26 | −21 | −16 | −20 | 45 | 100 |
| 3-Carene/β-Pinene | 76 | 43 | 0* | −21 | −18 | −28 | −1 | 92 |
| Tricyclene | 98 | 80 | 0* | −9 | −25 | −19 | 53 | 95 |

*DVPE data on 5% v/v blends indicates a physically impossible negative vapour pressure for the 3-carene/β-pinene sample and tricyclene according to the typically applied blend rule. The blending DVPE of these components has consequently been assigned as zero.

TABLE 3

| Fuel component | Boiling point (° C.) | LHV (MJ/kg) | Oxygen content (% w/w) | Density (kg/m$^3$) |
|---|---|---|---|---|
| EtOH (5% v) | 78 | 28 | 34.7 | 794 |
| EtOH (10% v) | 78 | 28 | 34.7 | 794 |
| 1-BuOH | 117 | 33 | 21.6 | 810 |
| α-Pinene | 154-167 | 43 | 0 | 863 |
| 3-Carene/β-Pinene | 164-179 | 43 | 0 | 866 |
| Tricyclene | 152 | 43 | 0 | 910* |

*Blending value, obtained from the Example 1 formulation.

Table 2 illustrates the superior octane properties of tricyclene compared to the other monoterpenes tested. Its blending MON is significantly higher than those of the other monoterpenes, whilst its blending RON of >95 ensures that there should be no RON penalty when tricyclene is blended with a base fuel such as GBF1: this is again in contrast to the small RON penalty and larger MON penalty that arise when adding the other monoterpenes to the base fuel. Thus, tricyclene can be seen to be superior to the other monoterpenes in terms of its fit with typical gasoline fuel specifications.

Table 2 also illustrates the superiority of tricyclene over ethanol, in terms of its impact on the DVPE and distillation properties of a gasoline fuel.

Table 3 shows that tricyclene has a higher LHV than ethanol and butanol, which can be expected to yield improvements in fuel economy for gasoline fuels containing tricyclene.

EXAMPLE 3

The oxidative stabilities of tricyclene, and of the two monoterpene samples used in Example 2, were tested and compared. For this purpose, the terpenes were dissolved in gasoline base fuels, the tricyclene at 4% v/v and the other samples at 5% v/v.

The induction period was measured using IP 40, the unwashed gum using IP 131 and the MIHPT rating using the method described in Example 1.

The base fuel in which the tricyclene was dissolved was a gasoline base fuel (RON: 95.6; MON: 85.0) which itself exhibited an induction period of 1105 minutes and an unwashed gum level of 7 mg/100 mL. The base fuel tested with the other two samples was a gasoline base fuel (RON: 96.1; MON: 85.1) which exhibited an induction period of 1378 minutes and an unwashed gum level of 2 mg/100 mL.

The results are shown in Table 4 below. The final column shows, for each of the monoterpene samples, the ratio of (a) the MIHPT rating for the base fuel/terpene blend to (b) the MIHPT rating for the base fuel alone.

TABLE 4

| Monoterpene | Induction period (min) | Unwashed gum (mg/100 mL) | Ratio of MIHPTs |
|---|---|---|---|
| α-Pinene | 1358* | 4 | 0.9 |
| 3-Carene/β-Pinene | 161 | 10 | 1.7 |
| Tricyclene | 1089 | 7 | 0.5 |

*Note that this sample was supplied containing the antioxidant BHT, which improves its overall stability.

It can be seen that the turpentine-derived monoterpene samples have a lower oxidative stability than tricyclene, although they can be stabilised (as in the case of the α-pinene sample) using antioxidant additives. Tricyclene, however, has acceptable stability even in the absence of antioxidant additives, making it a more suitable candidate for inclusion in a gasoline fuel formulation. Moreover, the deposit forming tendency of gasoline containing tricyclene (as shown by its ratio of MIHPTs in Table 4) is lower than that for gasoline containing other unstabilised monoterpenes (3-carene/β-pinene).

EXAMPLE 4

A number of monoterpenes, including tricyclene, were blended at both 5 and 10% v/v with a commercially available unleaded gasoline base fuel from Germany, GBF2. RON and MON values were measured (using the standard test methods EN 25164 and EN 25163 respectively) for each of the resultant blends. RON and MON values were also recorded for the base fuel alone, and for blends of 5 and 10% v/v ethanol in the base fuel.

The properties of GBF2 are summarised in Table 5 below.

TABLE 5

| Fuel property | Units | GBF2 |
|---|---|---|
| RON (EN 25164) |  | 98.2 |
| MON (EN 25163) |  | 87.5 |
| DVPE (EN ISO 3405) | kPa | 63.3 |
| Density @ 15° C. (EN 12185) | g/kg | 746.7 |
| Initial boiling point (EN ISO 3405) | ° C. | 33.0 |
| 5% recovery (T5) | ° C. | 47.5 |
| 10% recovery (T10) | ° C. | 54.6 |
| 20% recovery (T20) | ° C. | 66.4 |
| 30% recovery (T30) | ° C. | 78.7 |

TABLE 5-continued

| Fuel property | Units | GBF2 |
|---|---|---|
| 40% recovery (T40) | ° C. | 92.0 |
| 50% recovery (T50) | ° C. | 103.3 |
| 60% recovery (T60) | ° C. | 111.7 |
| 70% recovery (T70) | ° C. | 120.2 |
| 80% recovery (T80) | ° C. | 132.6 |
| 85% recovery (T85) | ° C. | 142.7 |
| 90% recovery (T90) | ° C. | 154.8 |
| 95% recovery (T95) | ° C. | 168.7 |
| Final boiling point | ° C. | 194.4 |
| Total recovery | % v/v | 97.8 |
| Percent residue | % v/v | 1.1 |
| Corrected loss | % v/v | 1.1 |
| Recovery @ 50 (E50) | % v/v | 6.7 |
| Recovery @ 70 (E70) | % v/v | 23.0 |
| Recovery @ 100 (E100) | % v/v | 46.9 |
| Recovery @ 125 (E125) | % v/v | 74.9 |
| Recovery @ 150 (E150) | % v/v | 88.0 |
| Recovery @ 180 (E180) | % v/v | 97.1 |

Of the terpenes used, myrcene and S(−)limonene were sourced from Sigma-Aldrich; ocimene, α-pinene and β-pinene from Aldrich; and R(+)limonene from Sigma. Myrcene and ocimene are acyclic monoterpenes. Limonene is a monocyclic monoterpene. Pinene is a bicyclic monoterpene.

The RON and MON results are shown in Table 6 below.

TABLE 6

| Added component | Concentration of added component (% v/v) | RON | MON |
|---|---|---|---|
| None (GBF2 alone) | — | 98.2 | 87.5 |
| Ethanol | 5 | 99.5 | 88.0 |
| Ethanol | 10 | 100.4 | 88.2 |
| Tricyclene | 5 | 98.0 | 86.9 |
| Tricyclene | 10 | 98.0 | 86.9 |
| Myrcene | 5 | 98.2 | 85.0 |
| Myrcene | 10 | 97.4 | 82.9 |
| Ocimene | 5 | 97.6 | 85.7 |
| Ocimene | 10 | 97.1 | 84.3 |
| S(−)Limonene | 5 | 98.1 | 86.2 |
| S(−)Limonene | 10 | 97.8 | 83.5 |
| R(+)Limonene | 5 | 97.4 | 86.1 |
| R(+)Limonene | 10 | 98.0 | 85.2 |
| α-Pinene | 5 | 97.4 | 85.7 |
| α-Pinene | 10 | 96.9 | 84.9 |
| β-Pinene | 5 | 97.2 | 85.4 |
| β-Pinene | 10 | 96.9 | 83.6 |

These measurements allowed the calculation of blending RON and MON values (BRON and BMON respectively) for the ethanol and the monoterpenes, as shown in Table 7. The values shown in Table 7 are averaged for the 5% and 10% v/v blends.

TABLE 7

| Added component | BRON | BMON |
|---|---|---|
| Ethanol | 122.2 | 96.0 |
| Tricyclene | 95.2 | 78.5 |
| Myrcene | 94.2 | 39.5 |
| Ocimene | 86.7 | 53.5 |
| S(−)Limonene | 95.2 | 54.5 |
| R(+)Limonene | 89.2 | 62.0 |
| α-Pinene | 83.7 | 56.5 |
| β-Pinene | 81.7 | 47.0 |

It can be seen from Table 7 that tricyclene has a blending MON which is superior to those of the other monoterpenes, making it more suitable for use as a gasoline fuel component.

EXAMPLE 5

Seven gasoline fuel formulations were prepared by blending the base fuel GBF2 with 10% v/v of each of the monoterpenes used in Example 4. An eighth formulation was prepared by blending GBF2 with 10% v/v of ethanol.

The lubricity of each of the prepared formulations, and of the base fuel itself, was then assessed using the following test method, which is a HFRR (high friction reciprocating rig) wear scar test based on ISO 12156. A sample of the fuel or blend under test was placed in a test reservoir that was maintained at a specified test temperature. A fixed steel ball was held in a vertically mounted chuck and forced against a horizontally mounted stationary steel plate with an applied load. The test ball was oscillated at a fixed frequency and stroke length while the interface with the plate was fully immersed in the fluid reservoir. The metallurgies of the ball and plate, and the temperature, load, frequency, and stroke length were as specified in ISO 12156. The ambient conditions during the test were then used to correct the size of the wear scar generated on the test ball to a standard set of ambient conditions, again as per ISO 12156. The corrected wear scar diameter provides a measure of the test fluid lubricity.

The results are shown in Table 8 below.

TABLE 8

| Added component | Wear scar diameter (μm) |
|---|---|
| None (GBF2 alone) | 886 |
| Ethanol | 765 |
| Tricyclene | 349 |
| Myrcene | 900 |
| Ocimene | 779 |
| S(−)Limonene | 815 |
| R(+)Limonene | 747 |
| α-Pinene | 864 |
| β-Pinene | 896 |

These results show a surprising improvement in lubricity for the tricyclene-containing blend. The lubricity-enhancing effects of the other components on the base fuel are much lower than those of the tricyclene, and indeed some of the monoterpenes yield little or no improvement in lubricity. This represents another potential advantage to the inclusion of tricyclene in a gasoline fuel.

It can be seen from these examples that blends of tricyclene with a gasoline base fuel can have octane numbers, DVPEs and distillation properties within ranges which are acceptable for use in spark ignition (petrol) engines, and indeed which conform to current gasoline standards such as EN 228. Such blends can also benefit from enhanced lubricity. Using the equations given above, a blend containing ethanol as well as tricyclene and base fuel can also be tailored to have acceptable properties, as can a blend containing one or more additional biofuels or oxygenates with tricyclene, a gasoline base fuel and optionally ethanol.

EXAMPLE 6

The elastomer swell caused by the eight formulations prepared in Example 5 was assessed using the standard test method DIN 51605-1 (measurements taken in triplicate). The elastomer tested was the nitrile elastomer SRE-NBR 34. The results are shown in Table 9 below.

TABLE 9

| Added component | Increase in volume (%) | Increase in mass (%) |
| --- | --- | --- |
| None (GBF2 alone) | 31.2 | 20.0 |
| Ethanol | 44.5 | 28.3 |
| Tricyclene | 29.2 | 18.6 |
| Myrcene | 30.6 | 19.6 |
| Ocimene | 31.1 | 20.2 |
| S(−)Limonene | 30.9 | 19.9 |
| R(+)Limonene | 30.6 | 19.8 |
| α-Pinene | 29.9 | 19.1 |
| β-Pinene | 29.8 | 19.0 |

These data show that tricyclene causes significantly less elastomer swell than ethanol, and indeed that it has an elastomer compatibility similar to that of the base fuel alone. Thus, tricyclene could be substituted for at least a proportion of the ethanol in an ethanol/gasoline blend, in order to mitigate the elastomer damaging effects caused by the ethanol.

We claim:

1. A gasoline fuel formulation comprising (i) at least 0.01% v/v tricyclene, (ii) at least 30% v/v a gasoline base fuel, and (iii) at least 1% v/v of at least one biofuel component comprising an oxygenate.

2. The formulation of claim 1 wherein the tricyclene is biologically derived.

3. The formulation of claim 1 wherein the at least one biofuel component comprises ethanol.

4. The formulation of claim 1, wherein the at least one biofuel component comprises one or more components selected from alcohols, ethers, esters, carboxylic acids and their derivatives, aldehydes, ketones, and any combination thereof.

5. The formulation of claim 1 wherein the difference between the dry vapour pressure equivalent (DVPE) of the fuel formulation and the gasoline base fuel is less than or equal to 0 kPa.

6. The formulation of claim 1 wherein $\Delta E70 + \Delta E100 = 0\%$ v/v, where $\Delta E70$ is the difference between the E70 of the fuel formulation and the gasoline base fuel, and $\Delta E100$ is the difference between the E100 of the fuel formulation and the gasoline base fuel.

7. The formulation of claim 1 wherein the difference between the motor octane number (MON) of the fuel formulation and the gasoline base fuel is greater than or equal to 0.

8. A process for the preparation of a gasoline fuel formulation comprising blending together at least 0.01% v/v tricyclene, at least 30% v/v a gasoline base fuel, and (iii) at least 1% v/v ethanol.

9. The process of claim 8 further comprising one or more biofuel components or oxygenates.

10. A method of operating an internal combustion engine, and/or a vehicle which is driven by an internal combustion engine, said method comprising introducing into a combustion chamber of the engine a gasoline fuel formulation of claim 1.

11. A system comprising an internal combustion engine and a source of a gasoline fuel formulation of claim 1.

12. A fuel component premix, suitable for inclusion in a gasoline fuel formulation, the premix comprising tricyclene and one or more components selected from biofuels and oxygenates, wherein the concentration of the tricyclene and the one or more components in the premix is selected to achieve a final concentration of at least 0.01% v/v tricyclene and at least 1% v/v of the one or more components when the premix is blended with a gasoline base fuel.

13. A method of operating an internal combustion engine, and/or a vehicle which is driven by an internal combustion engine, said method comprising introducing into a combustion chamber of the engine a gasoline fuel formulation comprising at least 0.01% v/v tricyclene and at least 1% v/v a biofuel component or oxygenate, and operating the engine under a condition to increase the octane number, reduce the vapour pressure, modify one or more distillation properties, increase the energy content, or reduce the elastomer damaging effects of the formulation compared with operating using a gasoline composition without the tricyclene.

14. The method of claim 13 wherein the biofuel component or oxygenate is ethanol.

15. A gasoline fuel formulation comprising (i) at least 0.01% v/v tricyclene, (ii) at least 30% v/v a gasoline base fuel, and (iii) at least 1% v/v of ethanol.

16. The gasoline fuel formulation of claim 15 wherein the ethanol is a biofuel component.

17. The gasoline fuel formulation of claim 16 further comprising at least one additional biofuel component.

18. The gasoline fuel formulation of claim 17 wherein the at least one additional biofuel component comprises an oxygenate.

19. The gasoline fuel formulation of claim 18 wherein the oxygenate is selected from the group consisting of other alcohols, ethers, esters, carboxylic acids and their derivatives, aldehydes, ketones, and any combination thereof.

20. The formulation of claim 3 further comprising an additional biofuel component, wherein the additional biofuel component comprises one or more components selected from alcohols, ethers, esters, carboxylic acids and their derivatives, aldehydes, ketones, and any combination thereof.

* * * * *